(12) United States Patent
Moon et al.

(10) Patent No.: US 7,491,768 B2
(45) Date of Patent: Feb. 17, 2009

(54) POLYMER RESIN FORMULATION HAVING ANTI-MICROBIAL OR ANTI-COAGULABILITY AND PREPARATION METHOD THEREOF

(76) Inventors: Woong-Sig Moon, 625-401 Sk Hanwha Apt, Jeongja-dong, Jangan-gu, Suwon-city, Gyeonggi-do (KR) 440-300; Jae-Chul Kim, 102-902 Ilsingeonyoung apt., 252 Geumgok-dong, Gwonseon-gu, Suwon-city, Gyeonggi-do (KR) 441-840; Youn-Seop Byoun, 278-25 Dundeok-ri, Seongsan-myeon, Gunsan-city, Jeollabuk-do (KR) 573-843; Kyoo-Hyun Chung, 109-701 Muak Hyundai apt., Muak-dong, Jongro-gu, Seoul (KR) 110-797; Heun-Soo Kang, 2-501 Samik Apt, Dogok-dong, Gangnam-gu, Seoul (KR) 135-857; Ki-Oh Kong, Ga-201 Geunhyeong-yeollip, Ilsin-dong, Bupyeong-gu, Incheon-city (KR) 403-100; Jung-Hwa Hwang, 394-13 Guro 2-dong, Guro-gu, Seoul (KR) 152-851

( * ) Notice: Subject to any disclaimer, the term of this patent is extended or adjusted under 35 U.S.C. 154(b) by 422 days.

(21) Appl. No.: 10/519,345

(22) PCT Filed: Jun. 25, 2003

(86) PCT No.: PCT/KR03/01249

§ 371 (c)(1),
(2), (4) Date: Dec. 23, 2004

(87) PCT Pub. No.: WO04/000924

PCT Pub. Date: Dec. 31, 2003

(65) Prior Publication Data

US 2005/0245671 A1    Nov. 3, 2005

(30) Foreign Application Priority Data

Jun. 25, 2002    (KR) ...................... 10-2002-0035793

(51) Int. Cl.
*C08L 1/00*    (2006.01)
(52) U.S. Cl. ...................... 524/543; 524/567; 524/556; 524/575.5

(58) Field of Classification Search .................. 524/543, 524/567, 556, 575.5
See application file for complete search history.

(56) References Cited

U.S. PATENT DOCUMENTS

| 6,231,875 | B1 * | 5/2001 | Sun et al. ..................... 424/401 |
| 7,226,968 | B2 * | 6/2007 | Hodge et al. ................. 524/514 |
| 2007/0065509 | A1 * | 3/2007 | Kanikanti et al. ........... 424/464 |

FOREIGN PATENT DOCUMENTS

| CN | 1229649 A | 9/1999 |
| DE | 199 36 059 A 1 | 2/2001 |
| EP | 0 081 853 | 6/1983 |
| EP | 0 294 905 | 12/1988 |
| JP | 08231317 | * 9/1996 |
| JP | 315910 | * 3/1997 |
| JP | 1997-315910 | 12/1997 |
| JP | 2002-038032 | 2/2002 |
| JP | 038032 | * 2/2002 |

OTHER PUBLICATIONS

Patent Abstracts of China, Publication No. CN 1229649A, Sep. 29, 1999, Abs in English.

* cited by examiner

*Primary Examiner*—Robert D. Harlan

(57) ABSTRACT

The present invention relates to an anti-microbial or anti-coagulating polymer resin and a method for preparing the same, and a medical appliance or instrument using the same, and more particularly to a method for preparing an anti-microbial or anti-coagulating medical polymer resin comprising the steps of simply mixing a polymer resin with at least one kind of pharmaceutically active material without using a solvent. The pharmaceutically active material is preferably an anti-microbial or anti-coagulant. According to the present invention, an anti-microbial or anti-coagulating material that is safe to a human body is mixed with a polymer resin by simple addition in an environmentally favorable non-solvent method, thereby maintaining superior anti-microbial effects even after high temperature molding, minimizing a released amount of anti-microbial to increase anti-microbial effect durability, and solving a toxic problem in a body. Therefore, the present invention can be extensively applied for medical appliances/instruments for a human body.

12 Claims, No Drawings

POLYMER RESIN FORMULATION HAVING ANTI-MICROBIAL OR ANTI-COAGULABILITY AND PREPARATION METHOD THEREOF

BACKGROUND OF THE INVENTION (a) Field of the Invention

The present invention relates to a method for preparing an anti-microbial or anti-coagulating polymer resin, particularly to a method for preparing a functional polymer resin that can prevent secondary bacterial infection, inhibit coagulation of blood when inserted into a human body, and maintain superior medicinal efficacy durability even after injection and extrusion molding, by combining a material that is safe to a human body, has superior compatibility with materials for commonly used medical instruments/appliances, and has superior anti-microbial or anti-coagulating properties on the surface of a product, with various materials for medical instruments/appliances such as silicon, etc., in a non-solvent form.

(b) Description of the Related Art

Various forms of organic anti-microbial formulations for conventional anti-microbial and anti-pollutant functions such as quaternary ammonium salt, chlorohexidine, carbendazim, thiazole, azole, Sn types, etc. have been reported. However, many of the anti-microbial and anti-pollutant products using the above materials have problems including unsecured safety due to toxicity, and ecosystem destruction due to release of environmental hormones. Additionally, their anti-microbial effects may be decreased due to thermal decomposition during high temperature processing, and product deterioration due to yellowing may also occur. Particularly, a polymer resin used in the medical field such as for an artificial blood vessel, an artificial heart, an artificial bone, artificial skin, etc. should be secured safety to a human body, and they should be protected from various pathogenic bacteria. However, anti-microbial materials of the prior art cannot completely satisfy these requirements.

Conventional technologies for inhibiting bacterial infection of medical instruments/appliances have been disclosed in various publications. As examples, U.S. Pat. No. 6,342,250 has disclosed a technology for coating a pharmaceutically active material on a polymer surface; U.S. Pat. No. 5,019,283 has disclosed a technology for coating a pharmaceutically active material selected from Ag and an anti-microbial composition on a polymer surface; and U.S. Pat. No. 5,902,283 has disclosed a technology for coating a pharmaceutically active material such as rifamycin, penicillin, ciprofloxacine, etc. on the surface of a catheter.

According to the above-mentioned conventional technologies, an anti-microbial material is coated on a surface by an additional process after preparing a product, and drugs are eluted by DDS (Drug Delivery System) to exhibit surface anti-microbial efficacy. However, they have disadvantages including process workability, durability and effect durability, toxic problems due to remaining materials that are excessively eluted in the body, and formation of volatile organic compounds (V.O.C) due to the use of an organic solvent for coating.

In addition, when medical instruments/appliances are inserted into a human body, they react in the following way with blood to cause blood coagulation. Firstly, plasma proteins such as fibrinogen, albumin gamma-globulin, etc. are absorbed into the medical instruments/appliances. After a protein such as fibrinogen, which causes formation of thromboses, is absorbed, adhesion of blood platelets begins to cause more adhesion and coagulation of blood platelets to form thromboses. Simultaneously, a blood coagulation system is operated as blood coagulation factors are activated, and finally thrombin activates fibrinogen into fibrin to coagulate fibrin, thereby generating blood coagulation.

In order to solve these blood coagulation problems, studies on technologies for preventing blood coagulation by medical instruments/appliances (e.g., catheters, stents, artificial bone, artificial articulation) are under progress. As examples, as a method for preventing formation of thromboses by inhibiting adhesion of blood platelets, a method of using albumin is known (M A Packham, G Evans, M F Glynn, and J F Mustard, The effects of plasma proteins on the interaction of platelet with glass surfaces, J. Lab. Clin, Med., 73: 686-97,1969; GH Ryu. Dk Han, YH Kim, and BG Min, Albumin immobilized polyurethane and its blood compatibility, Trans. Am. Soc. Artif. Int. Organs, 38: 644-648, 1992). Additionally, as a method for inhibiting formation of thromboses by inactivation of a coagulation factor, a method of combining heparin anticoagulant with a living body material is disclosed in EP 0 294 905 1A; and a method of treating heparin and polyethyleneoxide together is disclosed in EP 0081 853 1A. However, since these methods also use coating of anti-coagulants on an external surface, they cannot overcome the above-mentioned disadvantages of conventional bacterial infection inhibition technologies.

SUMMARY OF THE INVENTION

In order to solve these problems of the prior art, it is an object of the present invention to provide a method for preparing an anti-microbial or anti-coagulating polymer resin that can be easily prepared and has superior durability and compatibility by combining at least one kind of anti-microbial or anti-coagulating material, of which safety to a human body is secured, with a polymer resin in a non-solvent form without using a solvent.

It is another object of the present invention to provide a polymer resin prepared by the above method, which has superior compatibility with polymers and exhibits superior anti-microbial or anti-coagulating properties without being thermally decomposed even after molding processing, and thus can be extensively used for a medical polymer resin, natural rubber, petrochemical product, etc.

It is another object of the present invention to provide an anti-microbial or anti-coagulating polymer resin that can maintain a released amount of pharmaceutically active material at an appropriate level to solve the problem of toxicity by elution, and that can be extensively used for medical instruments/appliances which increase durability of pharmaceutical effects and do not comprise environmental hormones.

It is another object of the present invention to provide a method for preparing an anti-microbial or anti-coagulating medical instrument comprising the steps of mixing a polymer resin with a pharmaceutically active material under a non-solvent condition, and molding the mixture.

It is another object of the present invention to provide a method for preparing a household appliance or industrial appliance such as a food packaging film, a food container, a water-purifying apparatus, a drinking water tank, a laundry bath, a refrigerator, etc., or a master batch (M/B) or compound.

It is another object of the present invention to provide a medical instrument/appliance prepared using the above medical polymer resin.

In order to achieve these objects, the present invention provides a method for preparing an anti-microbial or anti-coagulating polymer resin, which method comprises the steps of mixing a polymer resin with at least one kind of pharmaceutically active material under a non-solvent condition.

The present invention also provides an anti-microbial or anti-coagulating medical polymer resin prepared by the above method, which has a maximum release concentration of pharmaceutically active materials of 10 ppm/100 hours in an aqueous solution.

The present invention also provides a method for preparing an anti-microbial or anti-coagulating medical instrument/appliance, which method comprises the steps of a) mixing a polymer resin with at least one kind of pharmaceutically active material under a non-solvent condition; and b) molding and processing the mixture.

Preferably, the method for preparing a medical instrument/appliance comprises the step of mixing a silicon resin with a pharmaceutically active material and conducting physical molding and processing at 450 to 600° C. for 5 seconds under a non-solvent condition to prepare a silicon catheter.

In addition, the present invention also provides a method for preparing a master batch or compound, which method comprises the steps of mixing a resin selected from a group consisting of linear low density polyethylene (LLDPE), polypropylene (PP), polyethylene (PE), acrylonitrile-butadiene-styrene (ABS) copolymer, polycarbonate (PC), polystyrene (PS), and polyvinylchloride (PVC), with at least one kind of pharmaceutically active material, and molding and processing at 100 to 300° C. under a non-solvent condition.

The present invention also provides an anti-microbial or anti-coagulating medical appliance prepared by the above method.

The present invention also provides an anti-microbial or anti-coagulating master batch or compound prepared by the above method.

The anti-microbial or anti-coagulating master batch can be used for preparing medical appliances, household appliances, industrial appliances, petrochemical appliances, etc.

The present invention also provides a method for preparing a paint, which method comprises the steps of mixing an anti-microbial material selected from a group consisting of grepafloxacin, sparfloxacin, clinafloxacin, enoxacin, lemefloxacin, norfloxacin, pipemidic acid, ciprofloxacin, temafloxacin, tosufloxacin, ketoconazole, itraconazole, econazole, isoconazole, fluconazole, miconazole, terbinafine, and a salt thereof, with one or more kinds of polymer resin selected from a group consisting of alkyd resin, acryl resin, urethane resin, epoxy resin, phenol resin, urea resin, melamine resin, and a modified resin thereof.

DETAILED DESCRIPTION OF THE PREFERRED EMBODIMENTS

The present invention will now be explained in more detail.

The present invention provides a method for preparing a polymer resin that has superior compatibility with commonly-used polymer resins and medical materials and has superior anti-microbial or anti-coagulating properties, and a polymer resin prepared by the method. The polymer resin having anti-microbial or anti-coagulating properties prepared by the method of the present invention can be used for medical appliances, household appliances, industrial appliances, petrochemical appliances, etc., and preferably for medical appliances.

Since the polymer resin prepared by the method of the present invention is of a non-solvent form as opposed to the conventional resins prepared with solvent, it can maintain pharmaceutical activity even if molded at a high temperature, it has industrial advantages in terms of production cost reduction and environmental favorableness, etc., and it can maintain a release concentration of pharmaceutically active materials at an appropriate level.

In addition, the method of the present invention can solve problems of a decrease in durability due to separation and adhesion of a surface coating film due to free flexibility of main material resins, and toxicity due to excessive drug amounts remaining in a body due to a drug delivery system at the surface thereof. Additionally, the method of the present invention can overcome problems of thermal decomposition of anti-microbial or anti-coagulating materials during high temperature processing, and thus the polymer resin of the present invention can be used for essential materials and products of the medical field because it can prevent yellowing of medical instruments/appliances and inhibit bacterial infection and blood coagulation when inserted into a human body.

The polymer resin prepared according to the present invention has a maximum release speed of anti-microbial materials of 10 ppm/100 hrs, and preferably a maximum speed of 5 ppm/100 hrs.

The anti-microbial or anti-coagulating polymer resin of the present invention comprises commonly used polymer resin and at least one kind of pharmaceutically active material.

The pharmaceutically active material is preferably selected from a group consisting of anti-microbials, anti-coagulants and a mixture thereof.

As the anti-microbial, materials known to be safe to a human body can be used. The anti-microbial, which has sterilizing effects or microorganism growth-inhibiting effects against bacteria or mold, includes an anti-microbial agent and an anti-fungi and anti-pollutant agent, and anti-microbial, anti-fungi, and anti-pollution effects can be expected by the combined use thereof.

The anti-microbial agent is preferably selected from a group consisting of grepafloxacin, sparfloxacin, clinafloxacin, enoxacin, lemefloxacin, norfloxacin, pipemidic acid, ciprofloxacine, temafloxacine, tosufloxacine, a salt thereof, and a mixture thereof.

The anti-microbial agent is preferably contained in the anti-microbial polymer resin of the present invention in an amount of 0.1 to 30 wt %, more preferably in an amount of 1 to 10 wt %. If the content of the anti-microbial agent is less than 0.1 wt %, the anti-microbial effect is slight, and if it exceeds 30 wt %, the improvement effect is not significant thus making it uneconomical.

The anti-fungi or anti-pollutant agent is preferably selected from a group consisting of ketoconazole, fluconazole, itraconazole, econazole, miconazole, isoconazole, terbinafin, a salt thereof, and a mixture thereof.

The anti-fungi or anti-pollutant agent is preferably contained in the polymer resin of the present invention in an amount of 0.1 to 30 wt %. If the content is less than 0.1 wt %, the anti-fungi effect is slight, and if it exceeds 30 wt %, the improvement effect is not significant thus making it uneconomical.

The anti-coagulant, which prevents coagulation of blood, is selected from a group consisting of warfarin, acetylsalicylic acid, ticlopidine, triflusal, clopidogrel, cilostazol, a salt thereof, and a mixture thereof.

The anti-coagulant is preferably contained in the anti-coagulating polymer resin in an amount of 0.1 to 20 wt %, and more preferably 1 to 10 wt %. If the content is less than 0.1 wt %, the pharmaceutical effect is slight, and if it exceeds 20 wt %, the improvement effect is not significant thus making it uneconomical.

The polymer resin is preferably used for a medical instrument or medical appliance, and any material that is safe and does not cause side effects can be used.

As the commonly used polymer resin, silicon resin, ABS, SAN, or LLDPE is preferably used. In addition, one or more kinds selected from a group consisting of polyetherimide (PEI), polyethylene (PE), polypropylene (PP), polycarbonate (PC), polyvinylchloride (PVC), polystyrene (PS), epoxy resin, polytetrafluoroethylene(PTFE), polyacetal (POM), polyamide (PA), polyurethane (PU), ethylene-vinylacetate copolymer (EVA), polymethylmethacrylate (PMMA), polyvinylalcohol (PVA), low density polyethylene (LDPE), high density polyethylene (HDPE), polyacrylonitrile, polybutadiene, polyacrylic acid, polyacrylimide, polysulfone, polyamide-imide, polyneoprene, polydimethylsiloxane, polyetheretherketone, polyphenylenesulfide, polyvinylfluoride, polyvinylacetate, polyvinylidinefluoride, polyethersulfone, polycaprolactone (PCL), and a copolymer thereof; natural rubber; and a synthetic rubber can also be used.

Among these, a medical polymer resin is preferably selected from a group consisting of polyethylene (PE), polypropylene (PP), polycarbonate (PC), polyvinylchloride (PVC), polystyrene (PS), epoxy resin, polytetrafluoroethylene (PTFE), polyacetal (POM), polyamide (PA), polyurethane (PU), ethylene-vinylacetate copolymer (EVA), polymethylmethacrylate (PMMA), polyvinylalcohol (PVA), polycaprolactone (PCL), and a copolymer thereof; silicon resin; natural rubber; and a synthetic rubber.

In addition, the method for preparing a polymer resin of the present invention may further comprise the step of adding one or more kinds of additives selected from a group consisting of an antioxidant, a heat-stabilizer, a dispersant, and a lubricant, which are commonly used in plastic molding processing. Preferably, a dispersant and an antioxidant are also added.

The dispersant functions for uniformly dispersing commonly used resin and pharmaceutically active material. The examples include N,N'-ethylene-bis-stearamide (E.B.S.), low density polyethylene wax, etc., and they can be used alone or in combination. If used, the E.B.S. functions as a lubricant. The content of the dispersant is preferably 0.1 to 15 wt % of the total composition. If the content is less than 0.1 wt %, dispersion is slight, and if it exceeds 15 wt %, a further effect improvement cannot be expected.

The antioxidant is used for preventing and inhibiting product deterioration such as discoloration due to oxygen in the air. Examples thereof include 2,6-di-tert-butyl-p-cresol, n-octadecyl-3-(4-hydroxy-3m5-ditert-butylphenyl)propionate, tetrabis[methylene-3-(3,5-di-tert-butyl-4-hydroxyphenyl)propionate]methane, 1,3,5-trimethyl-2,4,6-tris-(3, 5-di-t-butyl-4-hydroxybenzene)benzene, etc. The content of the antioxidant is preferably 0.1 to 2.5 wt % of the total composition. If the content is less than 0.1 wt %, the antioxidation effect is slight, and if it exceeds 2.5 wt %, a further effect improvement cannot be expected.

The heat-stabilizer is used for aiding maintenance of physical and chemical properties of the resin during usage of the final product, and prevention of thermal degeneration during processing. As the heat-stabilizer, zinc stearate [Zn(C17H35COO)2], magnesium stearate [Mg(C17H35COO)2], barium stearate [Ba(C17H35COO)2], etc. can be used. The content of the heat stabilizer is preferably 0.1 to 3.5 wt % of the total composition. If the content is less than 0.1 wt %, the heat stabilizing effect is slight, and if it exceeds 3.5 wt %, a further effect improvement cannot be expected.

In addition, according to the present invention, a medical instrument/appliance can be prepared using the medical polymer resin. The medical instrument/appliance is preferably a medical catheter, a prosthetic hand, a prosthetic foot, an artificial bone, an artificial articulation, artificial skin, an artificial kidney, a syringe, a blood transfusion pack, or an artificial tooth, and more preferably a silicon catheter, a prosthetic hand or a prosthetic foot. In addition, according to the present invention, a master batch or compound can be prepared using the medical polymer resin. The master batch or compound can be used as a high functional additive in processing of industrial appliances such as food packaging material, plastic, etc., and the added amount is preferably 0.1 to 30 wt %.

The silicon catheter can be prepared by mixing a silicon resin and pharmaceutically active material, and molding and processing the mixture under a non-solvent condition. Additionally, even if molding is conducted at a high temperature of 450 to 600° C./5 sec, pharmaceutical activity can be maintained.

In addition, in case an acrylonitrile-butadiene-styrene (ABS) or styrene-acrylonitrile (SAN) resin is used, a medical polymer resin that maintains pharmaceutical activity and has a low release concentration of pharmaceutically active material can be prepared by mixing the ABS or SAN resin with a pharmaceutically active material and then molding the mixture at 210 to 260° C.

In addition, in case a linear low density polyethylene resin (LLDPE) is used, a medical master batch or compound that has identical or superior pharmaceutical activity to the existing one and has a remarkably low release speed of a pharmaceutically active material can be prepared by mixing the LLDPE with a pharmaceutically active material and molding the mixture at 170 to 210° C.

In addition, according to the present invention, the petrochemical or household appliance selected from a group consisting of a water-purifying apparatus, a food packing film, a food container, a refrigerator, a washing machine, a computer and peripheral device, a drinking water tank, a water tub, a bidet nozzle and a toilet cover, a desk and chair, an automobile handle, infant goods, a bathtub, and a cosmetic container can be prepared using the master batch or compound prepared by the above method.

Since the method for preparing a medical appliance of the present invention conducts molding under a non-solvent condition, an anti-microbial or anti-coagulating medical instrument or medical appliance, or a master batch or compound can be provided by a very simple method. The anti-microbial or anti-coagulating medical instrument or appliance includes, for example, a silicon catheter, a prosthetic foot, a prosthetic hand, a surgery glove, artificial skin, an artificial kidney, an artificial articulation, an artificial bone, a blood bag, a tube, a syringe, and an artificial tooth, but it is not limited thereto.

The anti-microbial or anti-coagulating medical appliance prepared by the method of the present invention has a maximum release speed of pharmaceutically active material, for example an anti-microbial, of 10 ppm/100 hrs in an aqueous solution, and more preferably a maximum speed of 5 ppm/100 hrs.

In addition, according to the present invention, paint can be prepared by mixing a polymer resin and at least one kind of the anti-microbial and additive. The polymer resin is selected from a group consisting of alkyd resin, acryl resin, urethane resin, epoxy resin, phenol resin, urea resin, melamine resin, and a modified resin thereof; and the additive is selected from hydroxypropylacrylate, 1,6-hexanedioldiacrylate, pentaerythritoltriacrylate, or polyethylenedipentaerythritol. If required, commonly used additives such as a pigment, a diluent, a physical property controlling monomer and oligomer, a polyol (e.g., acryl polyol, urethane polyol, epoxy polyol, urea-melamine polyol, etc.), etc. can be further added to the liquid resin composition. As the physical property controlling monomer, one or more kinds selected from a group consisting of hydroxypropylacrylate (HPA), 1,6-hexandioldiacrylate (HDDA), pentaerythritol triacrylate (PETA), polyethylenglycoldiacrylate (PEGDA), trimethylolpropane ethoxylate triacrylate (TMPEOTA), and dipentaerythritol hexaacrylate (DPHA) can be used.

The anti-microbial and commonly used resin composition can be used as a coating agent, and natural curing, heat-curing, UV curing treatment, etc. can be involved.

The present invention will be explained with reference to the following Examples, but they are to illustrate the present invention and the present invention is not limited to them.

EXAMPLES

Example 1

Preparation of Anti-Microbial Polymer Resins and Anti-Microbial Tests

As an anti-microbial agent, norfloxacin and ciprofloxacin chlorate (hereinafter referred to as 'ciprofloxacin'), pipemidic acid, and enoxacin were added to and mixed with a commonly used resin with the composition as shown in the following Table 1, and zinc stearate as a heat stabilizer and paraffin wax and E.B.S. as a dispersant were added and all compounds were mixed in a high speed mixer. The composition was manufactured into a sample of a size of 4.5×7.0 cm while changing the temperature from 100 to 300° C. using a preexisting injection molding apparatus. The bacterial decrease rate was measured according to a shake flask method using E.coli (KCTC 1682) as a host, of which results are as shown in the following Table 1.

TABLE 1

|  |  | PP | LLDPE | LDPE | HDPE | ABS | SAN |
|---|---|---|---|---|---|---|---|
| Cipro-floxacin | 5 (wt %) | 95 | 95 | 95 | 95 | 95 | 95 |
|  | Bacteria decrease rate (%) | 100 | 100 | 100 | 100 | 99.99 | 99.99 |
|  | 1 (wt %) | 99 | 99 | 99 | 99 | 99 | 99 |
|  | Bacteria decrease rate (%) | 99.99 | 99.99 | 99.99 | 99.99 | 99.99 | 99.99 |
| Nor-floxacin | 5 (wt %) | 95 | 95 | 95 | 95 | 95 | 95 |
|  | Bacteria decrease rate (%) | 100 | 100 | 100 | 100 | 99.99 | 99.99 |
|  | 1 (wt %) | 99 | 99 | 99 | 99 | 99 | 99 |
|  | Bacteria decrease rate (%) | 99.99 | 99.99 | 99.99 | 99.99 | 99.99 | 99.99 |
| Pipemidic acid | 5 (wt %) | 95 | 95 | 95 | 95 | 95 | 95 |
|  | Bacteria decrease rate (%) | 99.99 | 99.99 | 99.99 | 99.99 | 99.97 | 99.97 |
|  | 1 (wt %) | 99 | 99 | 99 | 99 | 99 | 99 |
|  | Bacteria decrease rate (%) | 99.95 | 99.97 | 99.96 | 99.89 | 99.95 | 99.93 |
| Enoxacin | 5 (wt %) | 95 | 95 | 95 | 95 | 95 | 95 |
|  | Bacteria decrease rate (%) | 100 | 100 | 100 | 100 | 99.99 | 99.99 |
|  | 1 (wt %) | 99 | 99 | 99 | 99 | 99 | 99 |
|  | Bacteria decrease rate (%) | 99.99 | 99.99 | 99.99 | 99.99 | 99.96 | 99.94 |

Each commonly used resin (PP, LLDPE, LDPE, HDPE, ABS, SAN) comprised 0.2 wt % of zinc stearate, 0.2 wt % of paraffin wax and 0.25 wt % of E.B.S.

Example 2

Preparation of Anti-Microbial Master Batches and Anti-Microbial Tests

A known anti-microbial, a commercialized commonly used LLDPE resin, a dispersant, and an antioxidant were introduced into a high speed mixer, they were stirred at a high speed for about 30 minutes to mix, and then extrusion molded in an extrusion molding apparatus at a molding temperature of 170 to 210° C. to prepare an anti-microbial master batch in a pellet form. Each anti-microbial master batch or compound was prepared using HDPE and PP by the same method. Each compositional ratio is as shown in Table 2. Anti-microbial tests were conducted by the shake flask method, of which results are described in Table 3.

TABLE 2

Composition of anti-microbial master batches

|  | Pharmaceutically active material (wt %) | LLDPE[1] | HDPE[2] | PP[3] | Dispersant/ lubricant[4] | Antioxidant[5] | Dispersant[6] | Total (wt %) |
|---|---|---|---|---|---|---|---|---|
| Composition 1 | Ciprofloxacin 5 | 82.9 | — | — | 2 | 0.1 | 10 | 100 |
| Composition 2 | Norfloxacin 5 | — | 82.9 | — | 2 | 0.1 | 10 | 100 |
| Composition 3 | Enoxacin 5 | — | — | 83.4 | 1.5 | 0.1 | 10 | 100 |
| Composition 4 | Pipemidic acid 5 | 82.9 | — | — | 2 | 0.1 | 10 | 100 |
| Composition 5 | Clinafloxacin 5 | — | 82.9 | — | 2 | 0.1 | 10 | 100 |
| Composition 6 | Grepafloxacin 5 | — | — | 82.9 | 2 | 0.1 | 10 | 100 |
| Composition 7 | Lemefloxacin 5 | 82.9 | — | — | 2 | 0.1 | 10 | 100 |
| Composition 8 | Sparfloxacin 5 | — | 82.9 | — | 2 | 0.1 | 10 | 100 |
| Composition 9 | Temafloxacin 5 | — | — | 82.9 | 2 | 0.1 | 10 | 100 |

TABLE 2-continued

Composition of anti-microbial master batches

| | Pharmaceutically active material (wt %) | LLDPE[1] | HDPE[2] | PP[3] | Dispersant/ lubricant[4] | Antioxidant[5] | Dispersant[6] | Total (wt %) |
|---|---|---|---|---|---|---|---|---|
| Composition 10 | Tosufloxacin 5 | 82.9 | — | — | 2 | 0.1 | 10 | 100 |
| Composition 11 | Ciprofloxacin 5 + norfloxacin 5 | 77.9 | — | — | 2 | 0.1 | 10 | 100 | note)
[1] SK Co. Ltd. Product name CA 110
[2] SK Co. Ltd. Product name JH 910
[3] product name H360F
[4] N,N'-ethylene bis stearamide (E.B.S)
[5] n-octadecyl-3(3'-5'-di-t-butyl-4-hydroxyphenyl)propionate
[6] polyethylene wax

TABLE 3

Anti-microbial test for anti-microbial master batches (unit: %)

| | E. coli (KCTC 1682) | S. aureus (KCTC 1621) | S. typhimurium (KCTC 1925) | P. aeruginosa (KCTC 2004) |
|---|---|---|---|---|
| Composition 1 | 99.99 | 99.99 | 99.99 | 99.99 |
| Composition 2 | 99.99 | 99.99 | 99.99 | 99.99 |
| Composition 3 | 99.99 | 99.99 | 99.99 | 99.99 |
| Composition 4 | 99.99 | 99.99 | 99.99 | 99.99 |
| Composition 5 | 99.99 | 99.99 | 99.99 | 99.99 |
| Composition 6 | 99.99 | 99.99 | 99.99 | 99.99 |
| Composition 7 | 99.99 | 99.99 | 99.99 | 99.99 |
| Composition 8 | 99.99 | 99.99 | 99.99 | 99.99 |
| Composition 9 | 99.99 | 99.99 | 99.99 | 99.99 |
| Composition 10 | 99.99 | 99.99 | 99.99 | 99.99 |
| Composition 11 | 99.99 | 99.99 | 99.99 | 99.99 |

Example 3

Preparation of Anti-Microbial Master Batches

Anti-microbial master batches with the compositions as shown in Table 4 were prepared by finely powdering one or two components of ciprofloxacin, pipemidic acid, terbinafin chloric acid (hereinafter referred to as 'terbinafin') and miconazole, by the same method as in Example 2, and anti-microbial tests were conducted. The results are as described in Table 5. As a dispersant, N,N'-ethylene bis stearamide (E.B.S.) and polyethylene wax were used, and as an antioxidant, n-octadecyl-3(3'5'-di-t-butyl-4-hydroxyphenyl)propionate) was used.

TABLE 4

Compositions of anti-microbial master batches

| | LLDPE | Ciprofloxacin | Pipemidic acid | Terbinafin | Miconazole | Dispersant/ lubricant | Antioxidant | Dispersant | Total (wt %) |
|---|---|---|---|---|---|---|---|---|---|
| Composition 12 | 84.9 | 1 | — | 2 | — | 2 | 0.1 | 10 | 100 |
| Composition 13 | 84.9 | 1 | — | — | 2 | 2 | 0.1 | 10 | 100 |
| Composition 14 | 82.2 | — | 1 | 2 | — | 1.5 | 0.3 | 13 | 100 |
| Composition 15 | 82.2 | — | 1 | — | 2 | 1.5 | 0.3 | 13 | 100 |

TABLE 5

Anti-microbial test for anti-microbial master batch

| | Strain | Composition 12 | Composition 13 | Composition 14 | Composition 15 |
|---|---|---|---|---|---|
| Anti-microbial[1] (억제환) | E. coli (KCTC 1682) | 8 mm ± 1 mm | 9 mm ± 1 mm | 8 mm ± 1 mm | 10 mm ± 1 mm |
| | S. typhimurium (KCTC 1925) | 11 mm ± 1 mm | 11 mm ± 1 mm | 10 mm ± 1 mm | 10 mm ± 1 mm |
| | S. aureus (KCTC 1621) | 9 mm ± 1 mm | 8 mm ± 1 mm | 8 mm ± 1 mm | 7 mm ± 1 mm |

TABLE 5-continued

| | Anti-microbial test for anti-microbial master batch | | | | |
|---|---|---|---|---|---|
| | Strain | Composition 12 | Composition 13 | Composition 14 | Composition 15 |
| Anti-fungi[2] | *C. albicans* (KCTC 7729) | 0 grade | 0 grade | 0 grade | 0 grade |
| | *A. flavus* (KCTC 6961) | 0 grade | 0 grade | 0 grade | 0 grade |
| Anti-pollutant[3] | | Pass | pass | pass | Pass |

Note)
[1] measured by ASTM G22
[2] measured by ASTM G21
Grade: 0 grade - Mold did not grow on a sample.
1 grade - Mold grew within 10% on a sample.
2 grade - Mold grew 10 to 30% on a sample.
3 grade - Mold grew 30 to 60% on a sample.
4 grade - Mold grew 60% or more on a sample.

Example 4

Preparation of Anti-Microbial Films using Anti-Microbial Master Batch

Anti-microbial packaging films were prepared by adding the anti-microbial master batch of Composition 1 of Example 2 respectively to LDPE and CPP in an amount of 5%. Anti-microbial tests were conducted by ASTM G22. As a control, common LDPE and CPP films to which the anti-microbial master batch was not added were used. The results are as described in Table 6.

TABLE 6

| | | Anti-microbial test for anti-microbial film | | |
|---|---|---|---|---|
| | | *E. coli* (KCTC 1682) | *S. typhimurium* (KCTC 1925) | *K. pneumoniae* (KCTC 1621) |
| Control | LDPE | 0 mm | 0 mm | 0 mm |
| Example 4-1 | | 6 mm ± 1 mm | 11 mm ± 1 mm | 9 mm ± 1 mm |

TABLE 6-continued

| | | Anti-microbial test for anti-microbial film | | |
|---|---|---|---|---|
| | | *E. coli* (KCTC 1682) | *S. typhimurium* (KCTC 1925) | *K. pneumoniae* (KCTC 1621) |
| Control | CPP | 0 mm | 0 mm | 0 mm |
| Example 4-2 | | 8 mm ± 1 mm | 13 mm ± 1 mm | 10 mm ± 1 mm |

Example 5

Preparation of Anti-Microbial Cutting Boards

Anti-microbial cutting boards with a size of 24 cm×40 cm were prepared by respectively adding 1 wt %, 3 wt %, and 5 wt % of the anti-microbial master batches of Composition 1 of Example 2 to high density polyethylene (HDPE) resin. Injection molding was conducted at 170 to 210° C. In order to confirm durability of anti-microbial effects, after leaving the boards in flowing tap water for 30 days, anti-microbial effects before and after were compared. Results are as described in Table 7 (ASTM G22).

TABLE 7

| | Anti-microbial test for anti-microbial cutting boards | | | | | |
|---|---|---|---|---|---|---|
| | 1 wt % add | | 3 wt % add | | 5 wt % add | |
| | initial | After 30 days | initial | After 30 days | initial | After 30 days |
| *E. coli* (KCTC 1682) | 2.5 mm ± 1 mm | 2.0 mm ± 1 mm | 5.5 mm ± 1 mm | 5.0 mm ± 1 mm | 5.2 mm ± 1 mm | 5.1 mm ± 1 mm |
| *S. typhimurium* (KCTC 1925) | 3.5 mm ± 1 mm | 3.0 mm ± 1 mm | 7.0 mm ± 1 mm | 6.5 mm ± 1 mm | 7.5 mm ± 1 mm | 7.2 mm ± 1 mm |

Example 6

Preparation of Anti-Microbial Foly Catheters and Anti-Microbial Test

Anti-microbial foly catheters in the form of tubes were prepared by roll mixing a silicon resin, ciprofloxacin, and a catalyst with the composition of Table 8 for 30 to 60 minutes in an extrusion molding apparatus. Molding was conducted at 450 to 600° C./5 sec. The molded products were cured for 2 hours while maintaining them at 200° C. in a drier to remove remaining solvent. Anti-microbial test results are as described in Table 9. Anti-microbial effects were measured by ASTM G22 (measuring inhibited circle).

TABLE 8

Compositions of anti-microbial foly catheters

|  | Peroxide catalyst | Pt catalyst | cipro-floxacin | Silicon resin | Total (wt %) |
|---|---|---|---|---|---|
| Composition 16 | — | 0.2 | 0.3 | 99.5 | 100 |
| Composition 17 | 0.2 | — | 0.1 | 99.7 | 100 |
| Composition 18 | 0.2 | — | 0.3 | 99.5 | 100 |
| Composition 19 | 0.2% | — | 1.0 | 98.8 | 100 |
| Composition 20 | 0.2 | — | 3.0 | 96.8 | 100 |
| Composition 21 | 0.2 | — | 5.0 | 94.8 | 100 |

TABLE 9

Anti-microbial test for anti-microbial foly catheters

|  | S. aureus (AATC 1621) | E. coli (AATC 1682) | P. aeruginosa (AATC 2004) |
|---|---|---|---|
| Composition 16 | 2.0 ± 0.1 mm | 0.5 ± 0.1 mm | 1.0 ± 0.1 mm |
| Composition 17 | 2.0 ± 0.1 mm | 0.5 ± 0.1 mm | 1.0 ± 0.1 mm |
| Composition 18 | 2.0 ± 0.1 mm | 2.0 ± 0.1 mm | 1.5 ± 0.1 mm |
| Composition 19 | 6.0 ± 0.1 mm | 7.5 ± 0.1 mm | 6.5 ± 0.1 mm |
| Composition 20 | 14.0 ± 0.1 mm | 10.0 ± 0.1 mm | 7.5 ± 0.1 mm |
| Composition 21 | 14.0 ± 0.1 mm | 10.5 ± 0.1 mm | 7.5 ± 0.1 mm |

Example 7

Preparation of Anti-Microbial Silicon Prosthetic Feet and Anti-Microbial Test Anti-microbial prosthetic feet were prepared by roll mixing silicon resin and ciprofloxacin with the compositions of Table 10 respectively for 2 hours, introducing it into a mold to reflux for 1 hour while maintaining it at 160° C., and then cooling to room temperature. Anti-microbial performance was examined by measuring the bacteria decrease rate using the shake flask method. Results are as described in Table 11.

1) Shake flask method conditions:

Test bacterial fluid was shaken at 25° C. 150 times/min.

2) Bacteria decrease rate was measured by the following Equation 1.

[Equation 1]

Decrease rate=(number of bacteria in blank after 24 hours−number of bacteria in sample after 24 hours)/ (number of bacteria in blank after 24 hours−number of bacteria)×100

TABLE 10

Compositions of anti-microbial prosthetic feet

|  | ciprofloxacin | Silicon resin | Total (wt %) |
|---|---|---|---|
| Composition 22 | 1.0 | 99.0 | 100 |
| Composition 23 | 3.0 | 97.0 | 100 |
| Composition 24 | 5.0 | 95.0 | 100 |
| Composition 25 | 10 | 90.0 | 100 |

TABLE 11

Anti-microbial test for anti-microbial silicon prosthetic feet.

|  |  | Number of bacteria | | Decrease rate (%) |
|---|---|---|---|---|
|  |  | Immediately after inoculation | After 24 hours |  |
| S. aureus (ATCC 6538) | Blank | $5.0 \times 10^5$ | $683 \times 10^9$ | — |
|  | composition 22 | $5.0 \times 10^5$ | 0 | 100 |
|  | composition 23 | $5.0 \times 10^5$ | 0 | 100 |
|  | composition 24 | $5.0 \times 10^5$ | 0 | 100 |
|  | composition 25 | $5.0 \times 10^5$ | 0 | 100 |
| P. aeruginosa (ATCC 27853) | Blank | $5.0 \times 10^5$ | $1.72 \times 10^{10}$ | — |
|  | composition 22 | $5.0 \times 10^5$ | $6.0 \times 10^2$ | 99.99 |
|  | composition 23 | $5.0 \times 10^5$ | 0 | 100 |
|  | composition 24 | $5.0 \times 10^5$ | 0 | 100 |
|  | composition 25 | $5.0 \times 10^5$ | 0 | 100 |

Example 8

Preparation of Anti-Microbial or Anti-Coagulating Master Batches and Anti-Microbial or Anti-Coagulating Test Medical master batches with the compositions of Table 12 were prepared by adding 2 components of warfarin, ticlopidine, and clopidogrel, which are known anti-microbial and anti-coagulating materials, to polyurethane (PU) resin, polypropylene (PP) resin, or linear low density polyethylene (LLDPE), which are commonly used medical polymer resins, in a non-solvent process. Anti-microbial effects were examined by the shake flask method, and the results are as described in Table 13.

TABLE 12

Compositions of anti-microbial and anti-coagulating master batches

|  | Pharmaceutically active material (wt %) | PU | PP | LLDPE | total (wt %) |
|---|---|---|---|---|---|
| Composition 26 | Warfarin 5 | 95 | — | — | 100 |
| Composition 27 | Warfarin 5 | — | 95 | — | 100 |
| Composition 28 | Warfarin 5 | — | — | 95 | 100 |
| Composition 29 | Ciprofloxacin 5 + warfarin 5 | 90 | — | — | 100 |
| Composition 30 | Ciprofloxacin 5 + clopidogrel 5 | — | 90 | — | 100 |
| Composition 31 | Ciprofloxacin 5 + ticlopidine 5 | — | — | 90 | 100 |
| Composition 32 | Norfloxacin 5 + clopidogrel 5 | 90 | — | — | 100 |
| Composition 33 | Norfloxacin 5 + warfarin 5 | — | 90 | — | 100 |

TABLE 12-continued

Compositions of anti-microbial and anti-coagulating master batches

| | Pharmaceutically active material (wt %) | PU | PP | LLDPE | total (wt %) |
|---|---|---|---|---|---|
| Composition 34 | Norfloxacin 5 + ticlopidine 5 | — | — | 90 | 100 |

Note)
Each resin (PU, PP, LLDPE) comprised 0.2 wt % of zinc stearate, 0.2 wt % of paraffin wax, and 25 wt % of E.B.S.

TABLE 13

Anti-microbial test for anti-microbial or anti-coagulating master batches

| | E. coli (KCTC 1682) | S. aureus (KCTC 1621) | S. typhimurium (KCTC 1925) | B. subtilis (KCTC 1021) | K. pneumoniae (KCTC 2690) |
|---|---|---|---|---|---|
| Composition 26 | 0 | 0 | 0 | 0 | 0 |
| Composition 27 | 0 | 0 | 0 | 0 | 0 |
| Composition 28 | 0 | 0 | 0 | 0 | 0 |
| Composition 29 | 99.99 | 99.99 | 99.99 | 99.99 | 99.99 |
| Composition 30 | 99.99 | 99.99 | 99.99 | 99.99 | 99.99 |
| Composition 31 | 99.99 | 99.99 | 99.99 | 99.99 | 99.99 |
| Composition 32 | 99.99 | 99.99 | 99.99 | 99.99 | 99.99 |
| Composition 33 | 99.99 | 99.99 | 99.99 | 99.99 | 99.99 |
| Composition 34 | 99.99 | 99.99 | 99.99 | 99.99 | 99.99 |

Anti-Coagulation Test for Anti-Microbial or Anti-Coagulating Master Batches

A Sprague-Dawley rat (Korean Biolink) with a body weight of 250 to 300 g was etherized, and then 3.6 ml of blood was taken with a 25 ml syringe by a heart perforation method. In order to inhibit blood coagulation, 0.4 ml of 3.8% sodium citrate was previously introduced into the syringe, and the blood taken was instantly used for the test.

The master batches (M/B) of Compositions 26 to 34 and a control master batch that did not contain pharmaceutically active material were respectively immersed in the rat blood solution, and then after 1 hour, anti-coagulation effects were compared. Results are as described in Table 14.

TABLE 14

| | After 20 minutes | After 40 minutes | After 60 minutes |
|---|---|---|---|
| Control PU | + | ++ | +++ |
| Control PP | + | ++ | +++ |
| Control LLDPE | + | ++ | +++ |
| Composition 26 | − | + | + |
| Composition 27 | − | + | + |
| Composition 28 | − | + | + |
| Composition 29 | − | + | + |
| Composition 30 | − | + | + |
| Composition 31 | − | + | + |
| Composition 32 | − | + | + |
| Composition 33 | − | + | + |
| Composition 34 | − | + | + |

Note)
+++: Surface blood coagulation seriously appeared.
++: Surface blood coagulation appeared.
+: Surface blood coagulation slightly appeared.
−: No surface blood coagulation appeared Control PU, PP, and PE master batches showed serious blood aggregation after 1 hour, while master batches comprising the anti-coagulant showed delayed blood coagulation.

As can be seen from the results of Tables 13 and 14, antimicrobial and anti-coagulation effects were maintained even after molding processing.

Example 9

Preparation of Anti-Microbial or Anti-Coagulating Polyurethane (PU) Catheters and Anti-Microbial or Anti-Coagulation Test Anti-microbial or anti-coagulating polyurethane catheters were prepared by roll mixing anti-microbial ciprofloxacin and norfloxacin and anti-coagulant norfloxacin with medical polyurethane (PU) with the compositions of Table 15, introducing it into a mold to reflux for 1 hour while maintaining it at 160° C., and then cooling to room temperature. Anti-microbial performance was examined by the shake flask method, and the results are described in Table 16. Anti-coagulation performance results are as described in Table 17.

TABLE 15

Compositions of anti-microbial or anti-coagulating polyurethane

| | Anti-coagulant | Anti-microbial | Polyurethane resin | Total (wt %) |
|---|---|---|---|---|
| Composition 35 | — | ciprofloxacin 3.0 | 97.0 | 100 |
| Composition 36 | — | norfloxacin 3.0 | 97.0 | 100 |
| Composition 37 | Warfarin 3 | — | 97.0 | 100 |
| Composition 38 | Warfarin 3 | — | 97.0 | 100 |
| Composition 39 | Warfarin 3 | ciprofloxacin 3.0 | 94.0 | 100 |
| composition 40 | Warfarin 3 | norfloxacin 3.0 | 94.0 | 100 |

TABLE 16

Anti-microbial test for anti-microbial or anti-coagulating polyurethane catheter

| | S. aureus (AATC 1621) | E. coli (AATC 1682) | P. aeruginosa (AATC 2004) |
|---|---|---|---|
| Composition 35 | 99.99 | 99.99 | 99.99 |
| Composition 36 | 99.99 | 99.99 | 99.99 |
| Composition 37 | 0 | 0 | 0 |
| Composition 38 | 0 | 0 | 0 |
| Composition 39 | 99.99 | 99.99 | 99.99 |
| Composition 40 | 99.99 | 99.99 | 99.99 |

Anti-coagulating tests for anti-microbial or anti-coagulating polyurethane catheters were conducted by the same method as in Example 8. The polyurethane catheter samples of Compositions 35 to 40 and the polyurethane catheter that did not comprise a pharmaceutically active material were immersed in the rat blood solution, and after 1 hour, anti-coagulating effects were compared. The results are as described in Table 17

TABLE 17

Anti-coagulating test for anti-microbial or anti-coagulating polyurethane catheter

|  | After 20 min. | After 40 min. | After 60 min. |
|---|---|---|---|
| Control PU | + | ++ | +++ |
| Composition 35 | + | ++ | +++ |
| Composition 36 | + | ++ | +++ |
| Composition 37 | − | + | + |
| Composition 38 | − | + | + |
| Composition 39 | − | + | + |
| Composition 40 | − | + | + |

The control polyurethane (PU) catheter and catheters that did not contain anti-coagulant showed serious blood aggregation after 1 hour, while the polyurethane catheter containing anti-coagulant showed delayed blood coagulation. As can be seen from the results of Tables 16 and 17, anti-microbial or anti-coagulating effects are maintained even after molding processing.

Example 10

Anti-Microbial Polyurethane Prosthetic Feet and Anti-Microbial Test

Anti-microbial polyurethane prosthetic feet were prepared by roll mixing medical polyurethane resin with anti-microbial materials with the compositions of Table 18 for 2 hours, introducing it into a mold to reflux for 1 hour while maintaining it at 160° C., and then cooling to room temperature. Anti-microbial performance was examined by the shake flask method, and the results are described in Table 19.

TABLE 18

Compositions of anti-microbial polyurethane prosthetic feet

|  | Anti-microbial | Polyurethane resin | Total (wt %) |
|---|---|---|---|
| Composition 41 | Ciprofloxacin 2.5 | 97.5 | 100 |
| Composition 42 | clinafloxacin 2.5 | 97.5 | 100 |
| Composition 43 | enoxacin 2.5 | 97.5 | 100 |
| Composition 44 | grepafloxacin 2.5 | 97.5 | 100 |
| Composition 45 | lemefloxacin 2.5 | 97.5 | 100 |
| Composition 46 | norfloxacin 2.5 | 97.5 | 100 |
| Composition 47 | Pipemidic acid 2.5 | 97.5 | 100 |
| Composition 48 | sparfloxacin 2.5 | 97.5 | 100 |
| Composition 49 | temafloxacin 2.5 | 97.5 | 100 |
| Composition 50 | tosufloxacin 2.5 | 97.5 | 100 |

TABLE 19

Anti-microbial test for anti-microbial polyurethane prosthetic feet

|  | S. aureus (AATC 1621) | E. coli (AATC 1682) | P. aeruginosa (AATC 2004) |
|---|---|---|---|
| Composition 41 | 99.99 | 99.99 | 99.99 |
| Composition 42 | 99.99 | 99.99 | 99.99 |
| Composition 43 | 99.99 | 99.99 | 99.99 |
| Composition 44 | 99.99 | 99.99 | 99.99 |
| Composition 45 | 99.99 | 99.99 | 99.99 |
| Composition 46 | 99.99 | 99.99 | 99.99 |
| Composition 47 | 99.99 | 99.99 | 99.99 |
| Composition 48 | 99.99 | 99.99 | 99.99 |

TABLE 19-continued

Anti-microbial test for anti-microbial polyurethane prosthetic feet

|  | S. aureus (AATC 1621) | E. coli (AATC 1682) | P. aeruginosa (AATC 2004) |
|---|---|---|---|
| Composition 49 | 99.99 | 99.99 | 99.99 |
| Composition 50 | 99.99 | 99.99 | 99.99 |

Example 11

Preparation of Anti-Microbial Gloves and Anti-Microbial Test

Medical gloves were prepared by mixing medical PVC resin with anti-microbials with the compositions of Table 20, and compressing them into films. Anti-microbial performance was examined by the shake flask method, and the results are as described in Table 21.

TABLE 20

Compositions of anti-microbial medical gloves

|  | Pharmaceutically active material | PVC resin | Total (wt %) |
|---|---|---|---|
| Composition 51 | Ciprofloxacin 2.5 | 97.5 | 100 |
| Composition 52 | clinafloxacin 2.5 | 97.5 | 100 |
| Composition 53 | enoxacin 2.5 | 97.5 | 100 |
| Composition 54 | grepafloxacin 2.5 | 97.5 | 100 |
| Composition 55 | lemefloxacin 2.5 | 97.5 | 100 |
| Composition 56 | norfloxacin 2.5 | 97.5 | 100 |
| Composition 57 | Pipemidic acid 2.5 | 97.5 | 100 |
| Composition 58 | sparfloxacin 2.5 | 97.5 | 100 |
| Composition 59 | temafloxacin 2.5 | 97.5 | 100 |
| Composition 60 | tosufloxacin 2.5 | 97.5 | 100 |

TABLE 21

Anti-microbial test for anti-microbial gloves

|  | S. aureus (AATC 1621) | E. coli (AATC 1682) | P. aeruginosa (AATC 2004) |
|---|---|---|---|
| Composition 51 | 99.99 | 99.99 | 99.99 |
| Composition 52 | 99.99 | 99.99 | 99.99 |
| Composition 53 | 99.99 | 99.99 | 99.99 |
| Composition 54 | 99.99 | 99.99 | 99.99 |
| Composition 55 | 99.99 | 99.99 | 99.99 |
| Composition 56 | 99.99 | 99.99 | 99.99 |
| Composition 57 | 99.99 | 99.99 | 99.99 |
| Composition 58 | 99.99 | 99.99 | 99.99 |
| Composition 59 | 99.99 | 99.99 | 99.99 |
| Composition 60 | 99.99 | 99.99 | 99.99 |

Example 12

Preparation of Anti-Microbial Liquid Polymer Resin Compositions

One or two kinds of the anti-microbials ciprofloxacine and norfloxacin, and the anti-fungi/anti-pollutants ketoconazole and fluconazole, were finely powdered. The anti-microbials were slowly introduced into a mixer containing a liquid phase resin at room temperature while stirring at a high speed to uniformly mix them to prepare a liquid anti-microbial resin composition with the compositions of Table 22 (unit: wt %).

TABLE 22

Anti-microbial liquid polymer resin compositions

| Anti-microbial | Epoxy resin[1] | Urethane-acrylate resin[2] | Acryl-melamine resin[3] | Alkyd-melamine resin[4] | Acryl-polyol resin[5] |
|---|---|---|---|---|---|
| Ciprofloxacin 1 | 99 | 99 | 99 | 99 | 99 |
| Norfloxacin 1 | 99 | 99 | 99 | 99 | 99 |
| Ketoconazole 0.5 | 99.5 | 99.5 | 99.5 | 99.5 | 99.5 |
| Norfloxacin 1 + fluconazole 0.5 | 98.5 | 98.5 | 98.5 | 98.5 | 98.5 |

TABLE 22-continued

Anti-microbial liquid polymer resin compositions

| Anti-microbial | Epoxy resin[1] | Urethane-acrylate resin[2] | Acryl-melamine resin[3] | Alkyd-melamine resin[4] | Acryl-polyol resin[5] |
|---|---|---|---|---|---|
| Ciprofloxacin 1 + ketoconazole 0.5 | 98.5 | 98.5 | 98.5 | 98.5 | 98.5 |

Note)
[1] Samwha paint industry Co. Ltd., product SB-EE-400
[2] Samwha paint industry Co. Ltd., product SB-V-100
[3] Samwha paint industry Co. Ltd., product SB-MA-61
[4] Samwha paint industry Co. Ltd., product SB-MA-20
[5] Aekyung Chemical Co. Ltd., product BURNOK Anti-Microbial, Anti-Pollution and Yellowing Tests for Anti-Microbial Liquid Polymer Resin The anti-microbial liquid resins prepared in Examples 12 were respectively coated on a polyethylene sheet and an aluminum plate, and then each of them was naturally cured, thermally cured, or UV-cured. Anti-microbial, anti-pollution, and yellowing tests were conducted, and the results are as described in Table 23.

TABLE 23

Curing conditions and anti-microbial, yellowing, and anti-pollution test results

| | Composition | Composition 2[2] | Composition 3[3] | Composition 4[4] |
|---|---|---|---|---|
| Curing method | natural | thermal | UV | natural |
| Drying condition | 2 hrs (20° C.) | 30 min. (150° C. 160° C.) | 8 m/min (high pressure mercury lamp 80 W/cm 1 Lamp) | 2 hrs (20° C.) |
| Thickness of dried film (μm) | 40 | 40 | 20 | 40 |
| Anti-fungi property[5] | 4 grade | 4 grade | 4 grade | 0 grade |
| Anti-microbial property[6] (mm) | 7 | 8.0 | 7.5 | 7 |
| Yellowing[7] | pass | pass | pass | pass |
| Anti-polluting property[8] | — | — | pass | pass |

Note)
[1] ciprofloxacin 1 wt % + epoxy resin 99 wt %
[2] ciprofloxacin 1 wt % + (acryl + melamine resin) 99 wt %
[3] norfloxacin 1 wt % + fluconazole 0.5 wt % + (urethane + acrylate resin) 98.5 wt %
[4] ciprofloxacin 1 wt % + ketoconazole 0.5 wt % + epoxy resin 98.5 wt %
[5] strain: *P. citrinum* KCTC 6990 (measured by ASTM G21)
Grade: 0 grade - No mold growth on a sample
1 grade - Mold grew within 10% on a sample
2 grade - Mold grew 10 to 30% on a sample
3 grade - Mold grew 30 to 60% on a sample.
4 grade - Mold grew 60% or more on a sample.
[6] strain and test method: *E. coli*, KCTC 1682 (ASTM G22 method)
[7] yellowing test: measured by ASTM D1925
[8] Anti-pollution test: measured by ASTM D5589

Experiment 1

Measurement of Environmental Hormone of Medical Anti-Microbial Polymer Resin For the material of the medical appliances of the Examples, whether or not environmental hormone exists was examined by the EPA 8270 method using a GC/MS analyzing apparatus (Shimadzu QP5050A). The results are as described in Table 24.

TABLE 24

| | Test results for detection of environmental hormone | | | | | | |
|---|---|---|---|---|---|---|---|
| | Master batch | | | Catheter, | | Prosthetic feet | |
| Environmental hormone | Composition 1 | Composition 2 | Composition 3 | Composition 19 | Composition 20 | Composition 23 | Composition 41 |
| Diethylphthalate | x | x | x | x | x | x | x |
| Di-n-propyl Phthalate | x | x | x | x | x | x | x |
| Di-n-butyl phthalate | x | x | x | x | x | x | x |
| Di-n-pentyl phthalate | x | x | x | x | x | x | x |
| Di-2-ethylhexyl phthalate | x | x | x | x | x | x | x |
| N-buyl benzyl phthalate | x | x | x | x | x | x | x |
| Di-2-ethylhexyl adipate | x | x | x | x | x | x | x |
| 4-pentyl phenol | x | x | x | x | x | x | x |
| 4-octyl phenol | x | x | x | x | x | x | x |
| Nonyl phenol | x | x | x | x | x | x | x |

Note)
x: No detected environmental hormone
●: environmental hormone detected

As can be seen from the results of Table 24, no environmental hormone was detected from the master batches, catheters, or prosthetic feet, indicating that they are safe for medical appliances.

Experiment 2

Test for Elution of Anti-Microbial Material

For the material of the medical appliances/instruments of Examples, an anti-microbial material elution test was conducted using distilled water (DW) by KFDA 1999-18. The results are as described in Table 25.

TABLE 25

| | Anti-microbial material elution test | | | | |
|---|---|---|---|---|---|
| | Master batch | | Catheter, | | Prosthetic feet |
| | Composition 1 | Composition 2 | Composition 19 | Composition 20 | Composition 41 |
| Measurement of absorbance (250-350 nm): 0.1% or less | PASS | PASS | PASS | PASS | PASS |
| Non-volatile component: 1 mg 이하 | PASS (0.30 mg) | PASS (0.28 mg) | PASS (0.31 mg) | PASS (0.27 mg) | PASS (0.33 mg) |
| Heavy metal contents: ND | ND | ND | ND | ND | ND |
| pH: 1.0 or less | 0.33 | 0.29 | 0.35 | 0.32 | 0.41 |

Experiment 3

Measurement of Released Amount of Anti-Microbial or Anti-Coagulating Material For LLDPE M/B respectively containing 5% and 10% of ciprofloxacin and 10% of warfarin, the released amounts of anti-microbial material were measured with passage of time. The results are as described in Table 26.

TABLE 26

Measurement of released amount of anti-microbial or anti-coagulating material

|  | 3 hrs | 48 hrs | 120 hrs | 240 hrs | Elution test liquid |
|---|---|---|---|---|---|
| LLDPE M/B (containing 5% ciprofloxacin) | 1.2 ppm | 1.5 ppm | 1.5 ppm | 1.5 ppm continuous release | $H_2O$ |
| LLDPE M/B (containing 10% ciprofloxacin) | 2.5 ppm | 4 ppm | 5 ppm | 4 ppm-5 ppm continuous release | $H_2O$ |
| LLDPE M/B (containing 10% warfarin) | 0.9 ppm | 1.1 ppm | 1.2 ppm | 1.6 ppm-1.9 ppm continuous release | $H_2O$ |

As can be seen from Table 26, LLDPE polymer resin continuously released a maximum of 5 ppm of anti-microbial material, indicating that a rapid anti-microbial effect decrease can be prevented, thereby increasing anti-microbial effect durability. And, anti-coagulating material showed similar results. Such results can solve the toxic problem in a body due to excessive drug release.

As explained, the present invention mixes commonly used polymers such as silicon, urethane resin, etc. with pharmaceutically active materials that are safe to a human body by a simple addition method of non-solvent type instead of the preexisting method of coating an active material on the surface of a polymer after processing it using an organic solvent. Accordingly, mixing of a commonly used polymer resin and a pharmaceutically active material is superior without using a solvent, a superior anti-microbial effect can be maintained even after high temperature processing, and a toxic problem due to elution can be solved. Therefore, anti-microbial or anti-coagulating properties can be imparted to industrial appliances, household appliances, petrochemicals such as an anti-polluting paint, and natural rubber, as well as to medical materials.

What is claimed is:

1. A method for preparing an anti-microbial or anti-coagulating polymer resin comprising the step of mixing a polymer resin with at least one kind of pharmaceutically active material without using a solvent,
    wherein the pharmaceutically active material is an anti-microbial selected from the group consisting of grepafloxacin, sparfloxacin, clinafloxacin, enoxacin, lemefloxacin, norfloxacin, pipemidic acid, ciprofloxacin, temafloxacin, tosufloxacin, ketoconazole, itraconazole, econazole, isoconazole, fluconazole, miconazole, terbinafin, a salt thereof, and a mixture thereof,
    wherein the pharmaceutically active material is an anti-coagulant selected from a group consisting of warfarin, acetylsalicylic acid, ticlopidine, triflusal, clopidogrel, cilostazole, a salt thereof, and a mixture thereof, and
    wherein the method comprises the step of adding one or more kinds of additives selected from a group consisting of a dispersant, an anti-oxidant, and a heat stabilizer,
    wherein the polymer resin is selected from a group consisting of polyetherimide, polyethylene, polypropylene, polycarbonate, polyvinylchloride, polystyrene, epoxy resin, polytetrafluoroethylene, polyacetal, polyamide, polyurethane, ethylene-vinylacetate copolymer, polymethylmethacrylate, polyvinylalcohol, linear low density poly ethylene, low density polyethylene, high density polyethylene, acrylonitrile-butadiene-styrene, styrene-acrylonitrile, polyacrylonitrile, polybutadiene, polyacrylic acid, polyacrylimide, polysulfone, polyacetal, polyamide-imide, polytetrafluoroethylene, polyneoprene, polydimethylsiloxane, polymethylmethacrylate, polyetheretherketone, polyphenylenesulfide, polyvinylfluoride, polyvinylacetate, polyvinylidinefluoride, polyether sulfone, polycaprolactone and a copolymer thereof; a silicon resin; a natural rubber; a synthetic rubber; and a mixture thereof,
    wherein the dispersant is N,N'-ethylene bis stearamide, polyethylene wax, or a mixture thereof.

2. The method according to claim 1, wherein the pharmaceutically active material is contained in an amount of 0.1 to 30 wt % of the total composition.

3. The method according to claim 1, wherein the pharmaceutically active material is contained in an amount of 0.1 to 20 wt % of the composition.

4. A medical polymer resin prepared by the method of claim 1, which has a maximum release concentration of pharmaceutically active material of 10 ppm/100 hrs.

5. A method for preparing an anti-microbial or anti-coagulating medical appliance comprising the steps of:
    a) mixing a polymer resin with at least one kind of pharmaceutically active material without using a solvent; and
    b) molding and processing the mixture without using a solvent,
    wherein the pharmaceutically active material is an anti-microbial selected from a group consisting of grepafloxacin, sparfloxacin, clinafloxacin, enoxacin, lemefloxacin, norfloxacin, pipemidic acid, ciprofloxacin, temafloxacin, tosufloxacin, ketoconazole, itraconazole, econazole, isoconazole, fluconazole, miconazole, terbinafin, a salt thereof, and a mixture thereof, wherein the pharmaceutically active material is an anti-coagulant selected from a group consisting of warfarin, acetylsalicylic acid, ticlopidine, triflusal, clopidogrel, cilostazole, a salt thereof, and a mixture thereof, and wherein the medical appliance is selected from a group consisting of a silicon catheter, a prosthetic foot, a prosthetic hand, a medical catheter, a surgery glove, artificial skin, an artificial kidney, an artificial articulation, an artificial bone, a blood pack, a tube, a syringe, an artificial tooth, an artificial bone-fixing apparatus, an artificial blood vessel, an artificial fingernail, and an artificial toenail, wherein the method comprises the steps of mixing a silicon resin with a pharmaceutically active material, and molding and processing the mixture at a maximum temperature of 600 °C./sec without using a solvent to prepare a silicon catheter.

6. An anti-microbial or anti-coagulating medical appliance prepared by the method of claim 5.

7. The medical appliance according to claim 6, wherein the medical appliance has a maximum release concentration of pharmaceutically active material of 10 ppm/100 hrs.

8. A method for preparing a master batch or compound comprising the steps of:

mixing a resin selected from a group consisting of linear low density polyethylene, polypropylene, polyethylene, ABS, polycarbonate, polystyrene, and polyvinylchloride resin with at least one kind of pharmaceutically active material without using a solvent; and molding and processing the mixture at 100 to 300 °C. to prepare a master batch or compound, wherein the pharmaceutically active material is an anti-microbial selected from a group consisting of grepafloxacin, sparfloxacin, clinafloxacin, enoxacin, lemefloxacin, norfloxacin, pipemidic acid, ciprofloxacin, temafloxacin, tosufloxacin, ketoconazole, itraconazole, econazole, isoconazole, fluconazole, miconazole, terbinafin, a salt thereof, and a mixture thereof, wherein the pharmaceutically active material is an anti-coagulant selected from a group consisting of warfarin, acetylsalicylic acid, ticlopidine, triflusal, clopidogrel, cilostazole, a salt thereof, and a mixture thereof.

9. A master batch or compound prepared by the method of claim 8.

10. The master batch or compound according to claim 9, wherein the master batch or compound is used in any selected from a group consisting of a water-purifying apparatus, a cutting board, a food packaging film, a food container, a refrigerator, a washing machine, a computer and peripheral device, a drinking water tank, a water tub, bidet nozzle and a urinal cover, desk and chair, an automobile handle, infant goods, a bath tub, and a cosmetic container.

11. A method for preparing paint comprising the step of mixing an anti-microbial, polymer and additive, wherein the anti-microbial is selected from a group consisting of grepafloxacin, sparfloxacin, clinafloxacin, enoxacin, lemefloxacin, norfloxacin, pipemidic acid, ciprofloxacin, temafloxacin, tosufloxacin, ketoconazole, itraconazole, econazole, isoconazole, fluconazole, miconazole, terbinafin, a salt thereof, and a mixture thereof, a salt thereof, and a mixture thereof, wherein the polymer resin selected from a group consisting of alkyd resin, acryl resin, urethane resin, epoxy resin, phenol resin, urea resin, melamine resin, modified resin thereof, and a mixture thereof, wherein the additive is selected from hydroxypropylacrylate, 1,6-hexanedioldiacrylate pentaerythritoltriacrylate, or polyethylenedipentaerythritol.

12. The method according to claim 11 further comprising the step of adding one or more kinds of additives selected from a group consisting of a pigment, a diluent, and physical property controlling monomer and oligomer, and polyol.

\* \* \* \* \*